(12) United States Patent
Morita et al.

(10) Patent No.: US 9,444,499 B2
(45) Date of Patent: Sep. 13, 2016

(54) WIRELESS DEVICE AND WIRELESS ACCESS SYSTEM

(71) Applicant: FUJITSU LIMITED, Kawasaki-shi, Kanagawa (JP)

(72) Inventors: Junya Morita, Yokohama (JP); Yousuke Okazaki, Kawasaki (JP); Yoshinobu Shizawa, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/664,303

(22) Filed: Mar. 20, 2015

(65) Prior Publication Data

US 2015/0280756 A1    Oct. 1, 2015

(30) Foreign Application Priority Data

Mar. 28, 2014    (JP) .................................. 2014-070337

(51) Int. Cl.
| | |
|---|---|
| H04K 1/02 | (2006.01) |
| H04L 25/03 | (2006.01) |
| H04L 25/49 | (2006.01) |
| H04B 1/04 | (2006.01) |

(52) U.S. Cl.
CPC .................................. *H04B 1/0475* (2013.01)

(58) Field of Classification Search
CPC . H04B 1/0475; H04L 27/368; H04L 27/367; H04L 37/366
USPC .................. 375/296, 297, 285, 284, 346; 455/114.2, 114.3
See application file for complete search history.

(56) References Cited

U.S. PATENT DOCUMENTS

| | | | | |
|---|---|---|---|---|
| 7,848,449 B2* | 12/2010 | Nagatani | ................ | H03C 3/406 375/285 |
| 7,856,048 B1* | 12/2010 | Smaini | ..................... | H04B 1/40 330/2 |
| 2009/0088101 A1 | 4/2009 | Agawa | | |

FOREIGN PATENT DOCUMENTS

| | | |
|---|---|---|
| EP | 1 814 219 A1 | 8/2007 |
| JP | 2002-151973 A | 5/2002 |
| JP | 2007-19703 A | 1/2007 |
| JP | 2007-208380 A | 8/2007 |
| JP | 2008-199643 A | 8/2008 |
| JP | 2008-228043 A | 9/2008 |
| JP | 2009-89269 A | 4/2009 |

* cited by examiner

*Primary Examiner* — Phuong Phu
(74) *Attorney, Agent, or Firm* — Arent Fox LLP

(57) ABSTRACT

A wireless device includes a digital-to-analog converter that converts a digital transmission signal within a digital signal processing band to an analog transmission signal, a modulator that performs quadrature modulation of an analog transmission signal obtained by the digital-to-analog converter using a first local signal having a first frequency outside a frequency range, the frequency range centered around a center frequency of a transmission signal and having a bandwidth of the digital signal processing band, and outputs a modulated signal, a frequency converter that performs a frequency shift of a modulated signal output from the modulator using a second local signal having a second frequency within the frequency range, and an inhibitor that performs carrier leakage inhibition processing on the digital transmission signal, based on a signal obtained by the frequency converter.

11 Claims, 10 Drawing Sheets

WIRELESS DEVICE AND WIRELESS ACCESS SYSTEM

CROSS-REFERENCE TO RELATED APPLICATION

This application is based upon and claims the benefit of priority of the prior Japanese Patent Application No. 2014-070337, filed on Mar. 28, 2014, the entire contents of which are incorporated herein by reference.

FIELD

The embodiments discussed herein are related to a wireless device and a wireless access system.

BACKGROUND

Recently, with the growing speed of wireless communication, the frequency band of transmission signals has been becoming wider. In addition, in order to suppress degradation of signal quality, it is expected to suppress distortion to low levels over the wide band. For this reason, a complex intermediate frequency (IF) modulation method capable of implementing communication with low distortion in a wide band is employed in some wireless devices (particularly wireless base station devices). For example, in 3rd generation partnership project long term evolution (3GPP LTE)-advanced, where a bandwidth of 100 MHz is assumed, a complex IF modulation method is expected to be employed.

In the complex IF modulation method, an I-channel signal and a Q-channel signal are input to a digital-to-analog (D/A) converter, and then the D/A converter converts the I-channel signal and the Q-channel signal from digital signals to IF analog signals and outputs the signals. Then, a low pass filter (LPF) removes high frequency components of the I-channel signal and the Q-channel signal output from the D/A converter. Then, a quadrature modulator outputs a signal obtained by performing quadrature modulation of a carrier signal by using the I-channel signal and the Q-channel signal whose high frequency components have been removed by the LPF. Such techniques are disclosed in Japanese Laid-open Patent Publication No. 2008-228043, Japanese Laid-open Patent Publication No. 2008-199643, Japanese Laid-open Patent Publication No. 2002-151973, Japanese Laid-open Patent Publication No. 2007-019703, Japanese Laid-open Patent Publication No. 2007-208380, and Japanese Laid-open Patent Publication No. 2009-089269.

SUMMARY

According to an aspect of the invention, a wireless device includes a digital-to-analog converter that converts a digital transmission signal within a digital signal processing band to an analog transmission signal, a modulator that performs quadrature modulation of an analog transmission signal obtained by the digital-to-analog converter using a first local signal having a first frequency outside a frequency range, the frequency range centered around a center frequency of a transmission signal and having a bandwidth of the digital signal processing band, and outputs a modulated signal, a frequency converter that performs a frequency shift of a modulated signal output from the modulator using a second local signal having a second frequency within the frequency range, and an inhibitor that performs carrier leakage inhibition processing on the digital transmission signal, based on a signal obtained by the frequency converter.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In a complex IF modulation method, a carrier signal having a frequency shifted from the center frequency of a transmission signal by an intermediate frequency is used. That is, in a complex IF modulation method, the frequency of a carrier signal is not within a frequency range having a digital signal processing bandwidth, centered around the center frequency of a transmission signal. For this reason, a "carrier leakage (that is, a local leakage)" occurs outside the digital signal processing band.

Thus, when an attempt is made to suppress (inhibit) a carrier leakage by using digital signal processing, there is a possibility that no suppression effect will be obtained. If this carrier leakage component increases, an undesired frequency is likely to be transmitted from the wireless device. This is likely to lead to degradation in the transmission quality (for example, adjacent channel leakage power, error vector magnitude (EVM), or the like) of the wireless device.

In addition, if a measure other than the digital signal processing is employed in order to inhibit an undesired frequency from being transmitted, a filter is separately provided for suppressing an undesired frequency. This increases the circuit size to increase the size of a wireless device.

Hereinafter, embodiments of a wireless device and a wireless access system disclosed herein will be described in detail with reference to the accompanying drawings. It is noted that the wireless device and the wireless access system disclosed herein are not limited by the embodiments. Configurations having the same functions in the embodiments

First Embodiment

Exemplary Configuration of Wireless Device

Figure 1:
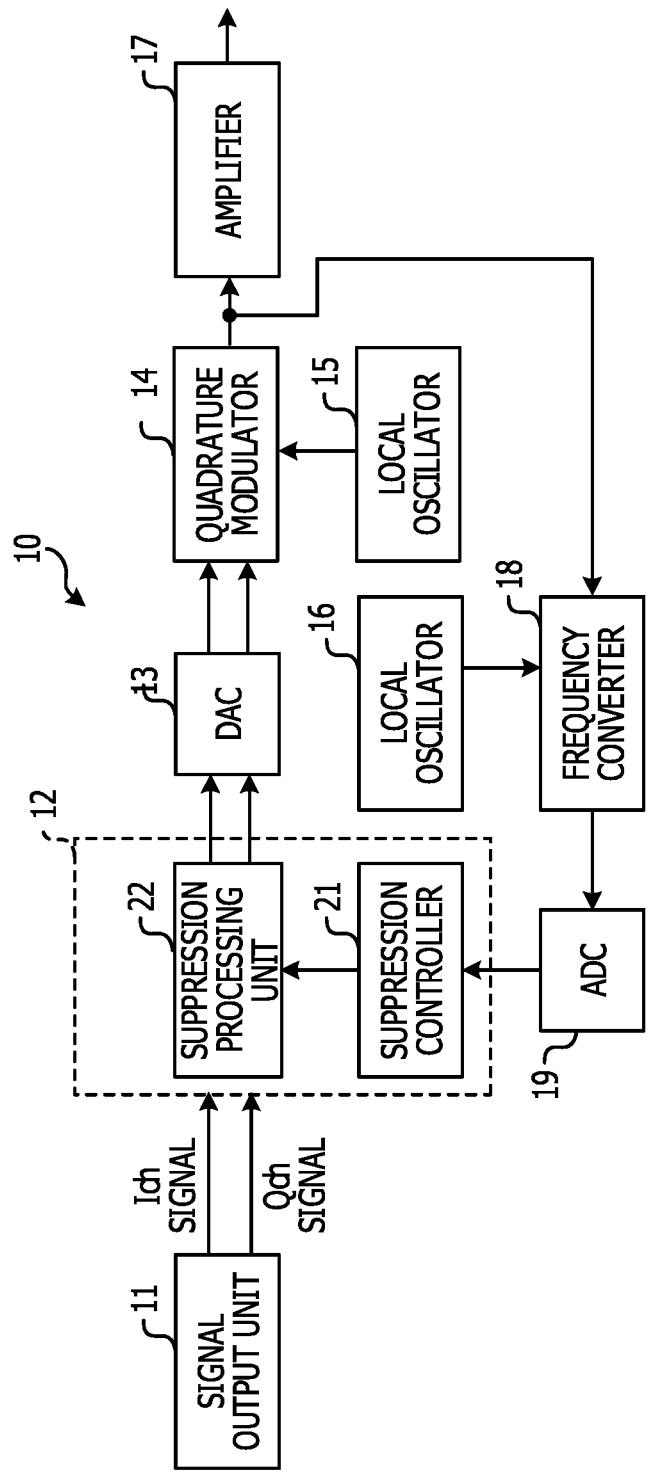
FIG. 1 is a block diagram illustrating an example of a wireless device of a first embodiment.

FIG. 1 is a block diagram illustrating an example of a wireless device of a first embodiment. In FIG. 1, a wireless device 10 includes a signal output unit 11, a carrier leakage suppression unit 12, a digital-to-analog converter (DAC) 13, a quadrature modulator 14, local oscillators 15 and 16, an amplifier 17, a frequency converter 18, and an analog-to-digital converter (ADC) 19.

The signal output unit 11 outputs a digital transmission signal. The digital transmission signal contains an in-phase (I) component (that is, I-channel signal) and a quadrature (Q) component (that is, Q-channel signal).

The carrier leakage suppression unit 12 computes carrier leakage compensation values based on an output signal of the quadrature modulator 14, and performs carrier leakage inhibition processing on the digital transmission signal using the computed carrier leakage compensation values. The digital transmission signal after being subjected to the carrier leakage suppression is output to the DAC 13.

For example, the carrier leakage suppression unit 12 includes a suppression controller 21 and a suppression processing unit 22 as illustrated in FIG. 1.

The suppression controller 21 detects "carrier leakage components" contained in the output signal of the quadrature modulator 14, and, based on the detection values of the detected carrier leakage components, computes carrier leakage compensation values (that is, DC offset compensation values). Then, the suppression controller 21 outputs the computed carrier leakage compensation values to the suppression processing unit 22. The carrier leakage inhibition processing performed by the suppression controller 21 is repeated, for example, until the detection values become below predetermined thresholds.

Figure 2:
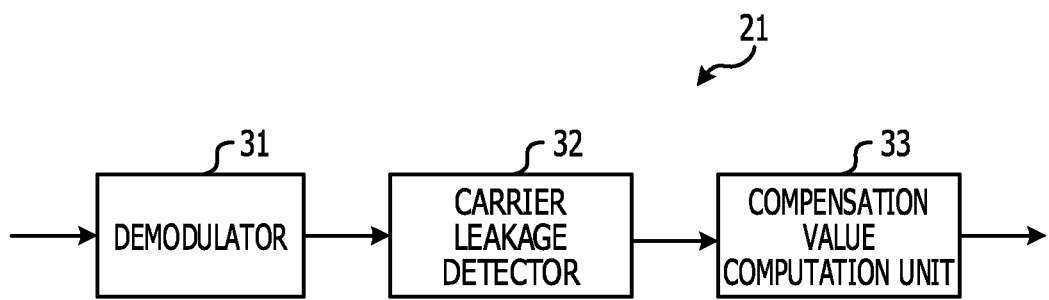
FIG. 2 is a block diagram illustrating an example of a suppression controller of the first embodiment.

For example, the suppression controller 21 includes a demodulator 31, a carrier leakage detector 32, and a compensation value computation unit 33 as illustrated in FIG. 2. FIG. 2 is a block diagram illustrating an example of a suppression controller of the first embodiment. The demodulator 31 demodulates a digital signal output from the ADC 19 to obtain an I component signal and a Q component signal. The carrier leakage detector 32 detects the carrier leakage components mentioned above based on the I component signal and the Q component signal obtained by the demodulator 31. For example, the carrier leakage detector 32 detects a carrier leakage component of the I component obtained by the demodulator 31 and detects a carrier leakage component of the Q component from the Q component signal obtained by the demodulator 31. Then, the compensation value computation unit 33 computes carrier leakage compensation values based on the detection values of the carrier leakage components detected by the carrier leakage detector 32. For example, the compensation value computation unit 33 computes a carrier leakage compensation value of the I component based on the detection value of the carrier leakage component of the I component detected by the carrier leakage detector 32. The compensation value computation unit 33 also computes a carrier leakage compensation value of the Q component based on the detection value of the carrier leakage component of the Q component detected by the carrier leakage detector 32.

Figure 3:
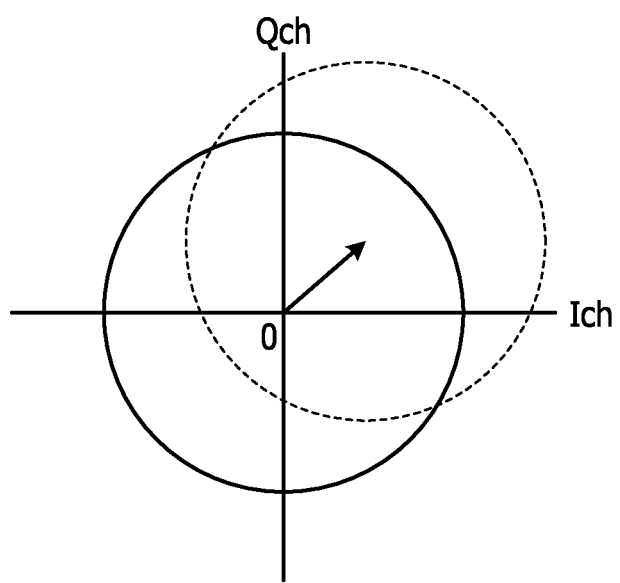
FIG. 3 is a diagram serving to illustrate an origin displacement on the IQ plane due to a carrier leakage.

Here, as illustrated in FIG. 3, a displacement (corresponding to the arrow of FIG. 3) arises between the origin on the IQ plane in the case where there are carrier leakage components and the ideal origin in the case where there are no carrier leakage components. Adjustment values for bringing the displacement between the origins close to zero are the carrier leakage compensation values mentioned above. FIG. 3 is a diagram serving to illustrate a displacement of the origins on the IQ plane due to carrier leakage.

Returning now to the description of FIG. 1, the suppression processing unit 22 performs carrier leakage inhibition processing on a digital transmission signal output from the signal output unit 11, using carrier leakage compensation values computed by the suppression controller 21. For example, the suppression processing unit 22 performs carrier leakage inhibition processing by adding up the digital transmission signal output from the signal output unit 11 and the carrier leakage compensation values computed by the suppression controller 21.

The DAC 13 converts the digital transmission signal after being subjected to the carrier leakage inhibition processing into an analog transmission signal of an intermediate frequency (IF). For example, the DAC 13 includes a digital modulator and performs modulation processing for conversion to an intermediate frequency with that digital modulator. Here, the processing in the carrier leakage suppression unit 12 and the processing in the DAC 13 are performed within a "digital signal processing band". For example, the "digital signal processing band" has a bandwidth of 500 MHz. The analog transmission signal output from the DAC 13 has, for example, a center frequency of 368.64 MHz. In this case, 368.64 MHz is the intermediate frequency. That is, a complex IF modulation method, for example, is applied to the wireless device 10.

The local oscillator 15 outputs a first local signal having a first frequency to the quadrature modulator 14. The first frequency is a frequency outside a "frequency range" (that is, a transmission band) centered around the center frequency of a transmission signal of the wireless device 10 and having the same bandwidth as the bandwidth of the digital signal processing band. For example, in a case where the center frequency of a transmission signal is 2140 MHz, the first frequency is a frequency apart from the center frequency of the transmission signal by the intermediate frequency (368.64 MHz) of the transmission signal, that is, a frequency of 2508.64 MHz.

The local oscillator 16 outputs a second local signal having a second frequency to the frequency converter 18. The second frequency is a frequency within the frequency range mentioned above, and is, for example, 2140 MHz.

The quadrature modulator 14 performs quadrature modulation of the first local signal output from the local oscillator 15 using an analog signal output from the DAC 13, and outputs the modulated signal obtained to the amplifier 17. Here, some of the modulated signals output from the quadrature modulator 14 are input as "feedback signals" to the frequency converter 18.

Figure 4:
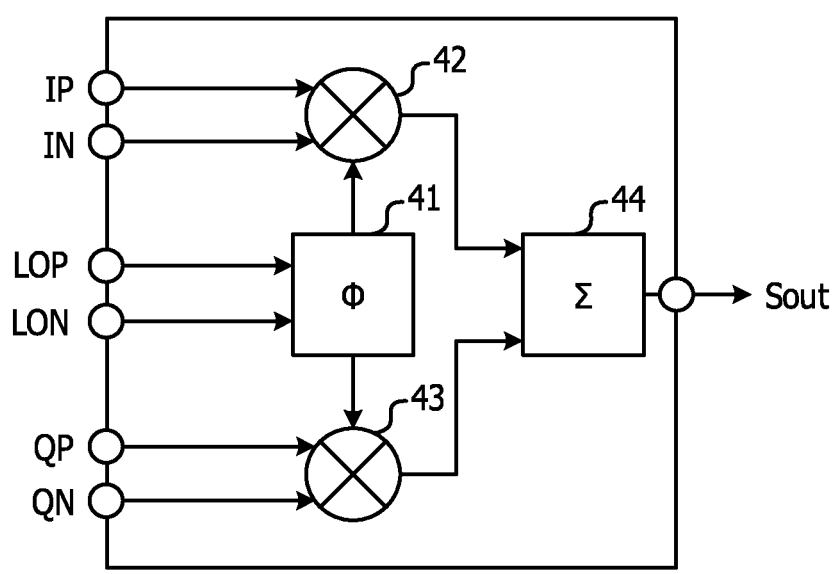
FIG. 4 is a diagram illustrating an example of a quadrature modulation unit of the first embodiment.

FIG. 4 is a diagram illustrating an example of a quadrature modulation unit of the first embodiment. In FIG. 4, the quadrature modulator 14 includes a sift unit 41, multiplication units 42 and 43, and an addition unit 44. The first local signal (that is, differential signals LOP and LON) is input to the shift unit 41, and the shift unit 41 outputs the input first local signal to the multiplication unit 42. The shift unit 41 also shifts the phase of the input first local signal by 90 degrees and outputs the signal to the multiplication unit 43. The multiplication unit 42 performs quadrature modulation of the first local signal received from the shift unit 41 using an I-channel analog transmission signal (that is, differential signals IP and IN) output from the DAC 13, and outputs the signal to the addition unit 44. The multiplication unit 43 performs quadrature modulation of the first local signal received from the shift unit 41 using a Q-channel analog transmission signal (that is, differential signals QP and QN) output from the DAC 13, and outputs the signal to the addition unit 44. The addition unit 44 adds up the signal received from the multiplication unit 42 and the signal received from the multiplication unit 43, and outputs the resultant signal as a modulated signal.

The amplifier 17 amplifies the modulated signal output from the quadrature modulator 14 and outputs an amplified signal. This amplified signal is, for example, transmitted through an antenna of a transmission apparatus in which the wireless device 10 is arranged.

The frequency converter 18 performs frequency shifting of a feedback signal using the second local signal, and outputs the feedback signal after being subjected to the frequency shifting to the ADC 19.

Here, the frequencies of the "carrier leakage components" contained in the feedback signal after being subjected to the frequency shifting are within the digital signal processing band. Thus, the carrier leakage suppression unit 12 may perform carrier leakage inhibition processing based on carrier leakage components within the digital signal processing band. This may improve the accuracy in the carrier leakage suppression.

The ADC 19 converts a feedback signal (analog signal) after being subjected to the frequency shifting into a digital signal, and outputs that digital signal to the suppression controller 21 of the carrier leakage suppression unit 12.

[Exemplary Operations of Wireless Device]

Figure 5:
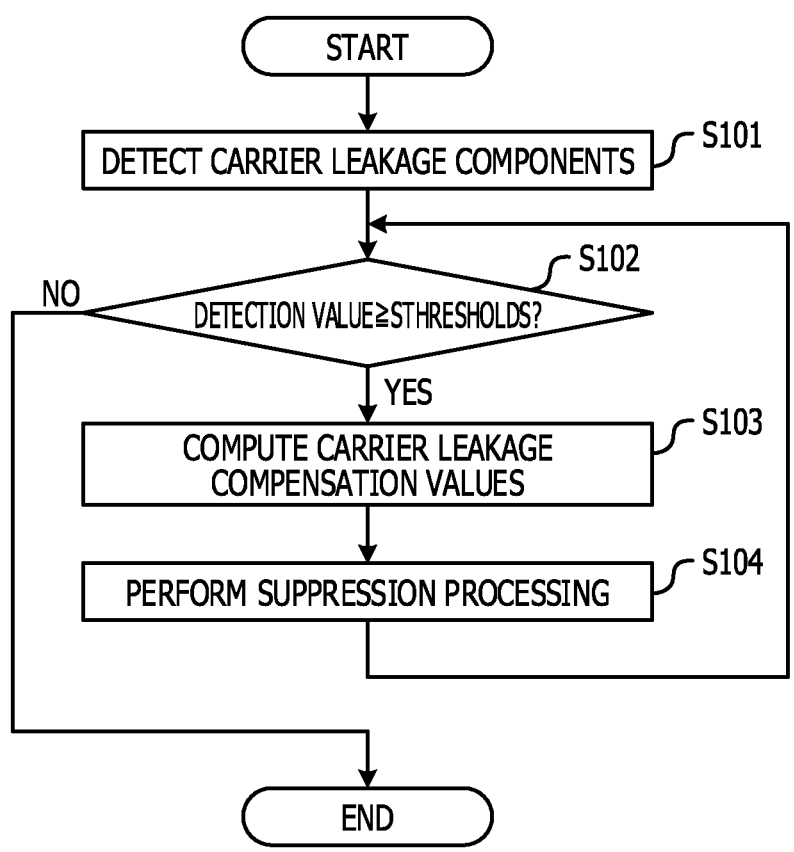
FIG. 5 is a flowchart illustrating an example of process operations of the wireless device of the first embodiment.

An example of process operations of the wireless device 10 having the configuration described above will be described. FIG. 5 is a flowchart illustrating an example of process operations of the wireless device of the first embodiment. In FIG. 5, particularly, an example of the process operations of the carrier leakage suppression unit 12 is illustrated. A process illustrated in FIG. 5 starts, for example, at a timing when a "carrier leakage inhibition processing period" starts.

The suppression controller 21 detects carrier leakage components based on a feedback signal (step (hereinafter abbreviated as "S") 101). The suppression controller 21 detects, for example, the power values of a carrier leakage components.

The suppression controller 21 determines whether or not the detection values are equal to or greater than thresholds (S102).

When the detection values are equal to or greater than the thresholds (Yes in S102), the suppression controller 21 computes carrier leakage compensation values based on the detection values (S103).

Using the carrier leakage compensation values computed by the suppression controller 21, the suppression processing unit 22 performs a process of suppressing a carrier leakage on a digital transmission signal output from the signal output unit 11 (S104). Then, the process returns to S102.

When the detection values are less than the thresholds (No in S102), the process ends.

As described above, according to this embodiment, the wireless device 10 performs quadrature modulation using the first local signal having the first frequency outside the frequency range, the frequency range being centered around the center frequency of a transmission signal and having the bandwidth of the digital signal processing band. Then, the frequency converter 18 arranged in the feedback path of the wireless device 10 performs frequency shifting of a feedback signal (the modulated signal here) using the second local signal having the second frequency within the frequency range mentioned above. Then, based on the feedback signal subjected to the frequency shifting, the carrier leakage suppression unit 12 performs carrier leakage inhibition processing on a digital transmission signal.

With this configuration of the wireless device 10, even when a modulation method in which quadrature modulation is performed using a local signal having a frequency outside the above frequency range, for example, a complex IF modulation method is employed, carrier leakage components may be within a digital signal processing band. Accordingly, the carrier leakage suppression unit 12 may perform carrier leakage inhibition processing based on carrier leakage components within the digital signal processing band. This may improve the accuracy in the carrier leakage suppression. Additionally, carrier leakage inhibition processing may be performed using a transmission signal. This may avoid stopping communication. Additionally, it is unnecessary to separately provide a filter in order to suppress an undesired frequency. This may avoid increasing the size of the wireless device 10.

Second Embodiment

In a second embodiment, a wireless device performs distortion compensation processing as well as the carrier leakage inhibition processing.

[Exemplary Configuration of Wireless Device]

Figure 6:
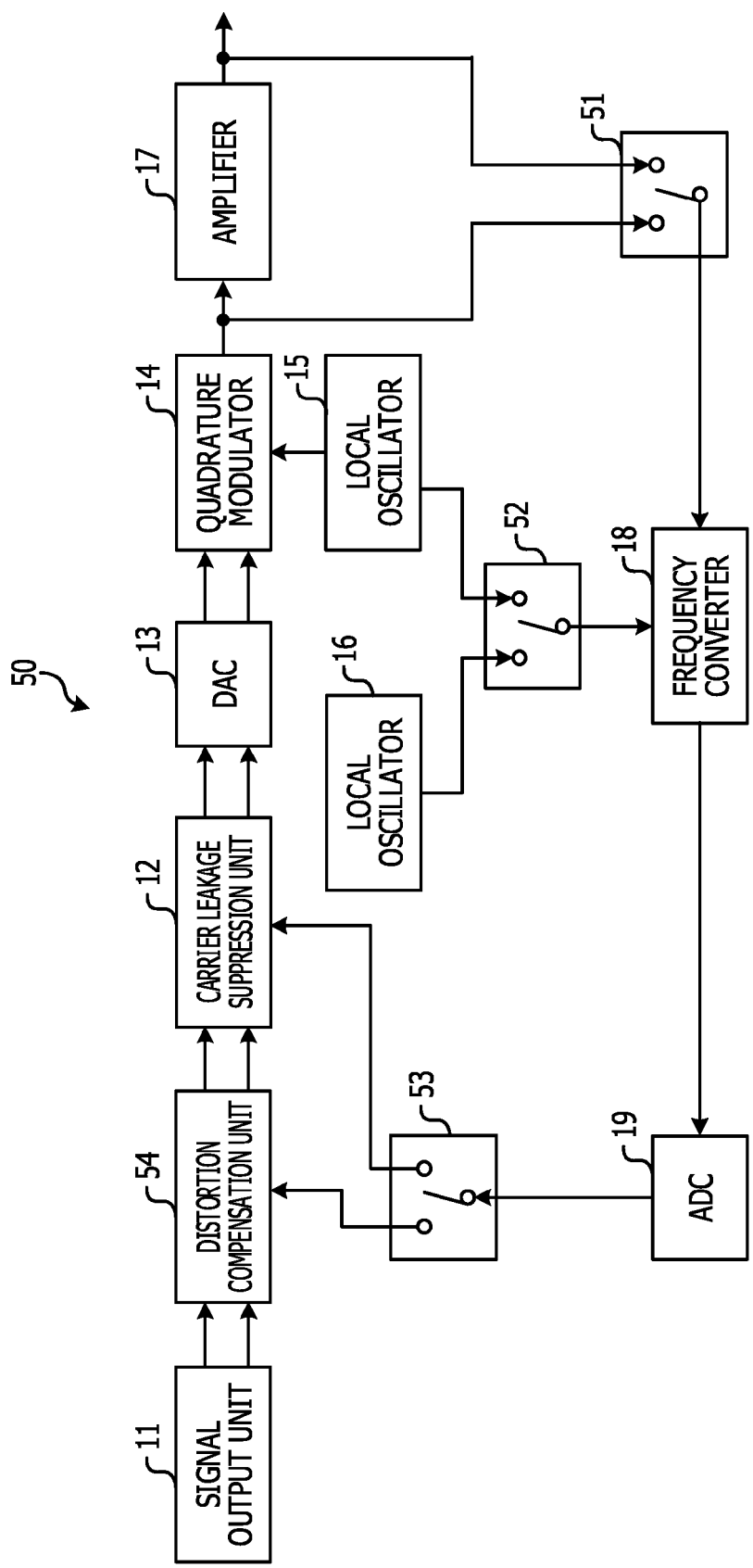
FIG. 6 is a block diagram illustrating an example of a wireless device of a second embodiment.

FIG. 6 is a block diagram illustrating an example of a wireless device of the second embodiment. In FIG. 6, the wireless device 50 includes switches 51, 52, and 53 and a distortion compensation unit 54.

The switch 51 includes two input terminals and one output terminal. A first input terminal of the switch 51 is coupled to the output of the quadrature modulator 14. A second input terminal of the switch 51 is coupled to the output of the amplifier 17. An output terminal of the switch 51 is coupled to the input of the frequency converter 18. The first input terminal and the output terminal of the switch 51 are coupled together during the "carrier leakage inhibition processing period", and the second input terminal and the output terminal of the switch 51 are coupled together during a "distortion compensation processing period". Thus, a modulated signal, which is an output of the quadrature modulator 14, is input to the frequency converter 18 during the "carrier leakage inhibition processing period", and an amplified signal, which is an output of the amplifier 17, is input to the frequency converter 18 during the "distortion compensation processing period". Note that the state of the switch 51 is changed by control of a controller (not illustrated). Note also that a state where the first input terminal and the output terminal of the switch 51 are coupled together is called a "first state" of the switch 51, and a state where the second input terminal and the output terminal of the switch 51 are coupled together is called a "second state" of the switch 51.

The switch 52 includes two input terminals and one output terminal. A first input terminal of the switch 52 is coupled to the output of the local oscillator 16. A second input terminal of the switch 52 is coupled to the output of the local oscillator 15. An output terminal of the switch 52 is coupled to the input of the frequency converter 18. The first input terminal and the output terminal of the switch 52 are coupled together during the "carrier leakage inhibition processing period", and the second input terminal and the output terminal of the switch 52 are coupled during the "distortion compensation processing period". Thus, the second local signal, which is an output of the local oscillator 16, is input to the frequency converter 18 during the "carrier leakage inhibition processing period", and the first local signal, which is an output of the local oscillator 15, is input to the frequency converter 18 during the "distortion compensation processing period". Note that the state of the switch 52 is changed by control of the controller mentioned above (not illustrated). Note also that a state where the first input terminal and the output terminal of the switch 52 are coupled together is called a "first state" of the switch 52, and a state where the second input terminal and the output terminal of the switch 52 are coupled together is called a "second state" of the switch 52.

The switch 53 includes one input terminal and two output terminals. The input terminal of the switch 53 is coupled to the output of the ADC 19. A first output terminal of the switch 53 is coupled to the input of the carrier leakage suppression unit 12. A second output terminal of the switch 53 is coupled to the input of the distortion compensation unit 54. The input terminal and the first output terminal of the switch 53 are coupled together during the "carrier leakage inhibition processing period", and the input terminal and the second output terminal of the switch 53 are coupled together during the "distortion compensation processing period". Thus, an output signal of the ADC 19 is input to the carrier leakage suppression unit 12 during the "carrier leakage inhibition processing period", and is input to the distortion compensation unit 54 during the "distortion compensation processing period". Note that the state of the switch 53 is changed by control of the controller mentioned above (not illustrated). Note also that a state where the input terminal and the first output terminal of the switch 53 are coupled is called a "first state" of the switch 53, and a state where the input terminal and the second output terminal of the switch 53 are coupled together is called a "second state" of the switch 53.

The distortion compensation unit 54 performs distortion compensation processing based on a signal obtained by the frequency converter 18 during the distortion compensation processing period. That is, the distortion compensation unit 54 performs distortion compensation processing (that is, digital pre-distortion) based on an output signal of the ADC 19 during the distortion compensation processing period.

[Process Operations of Wireless Device]

Figure 7:
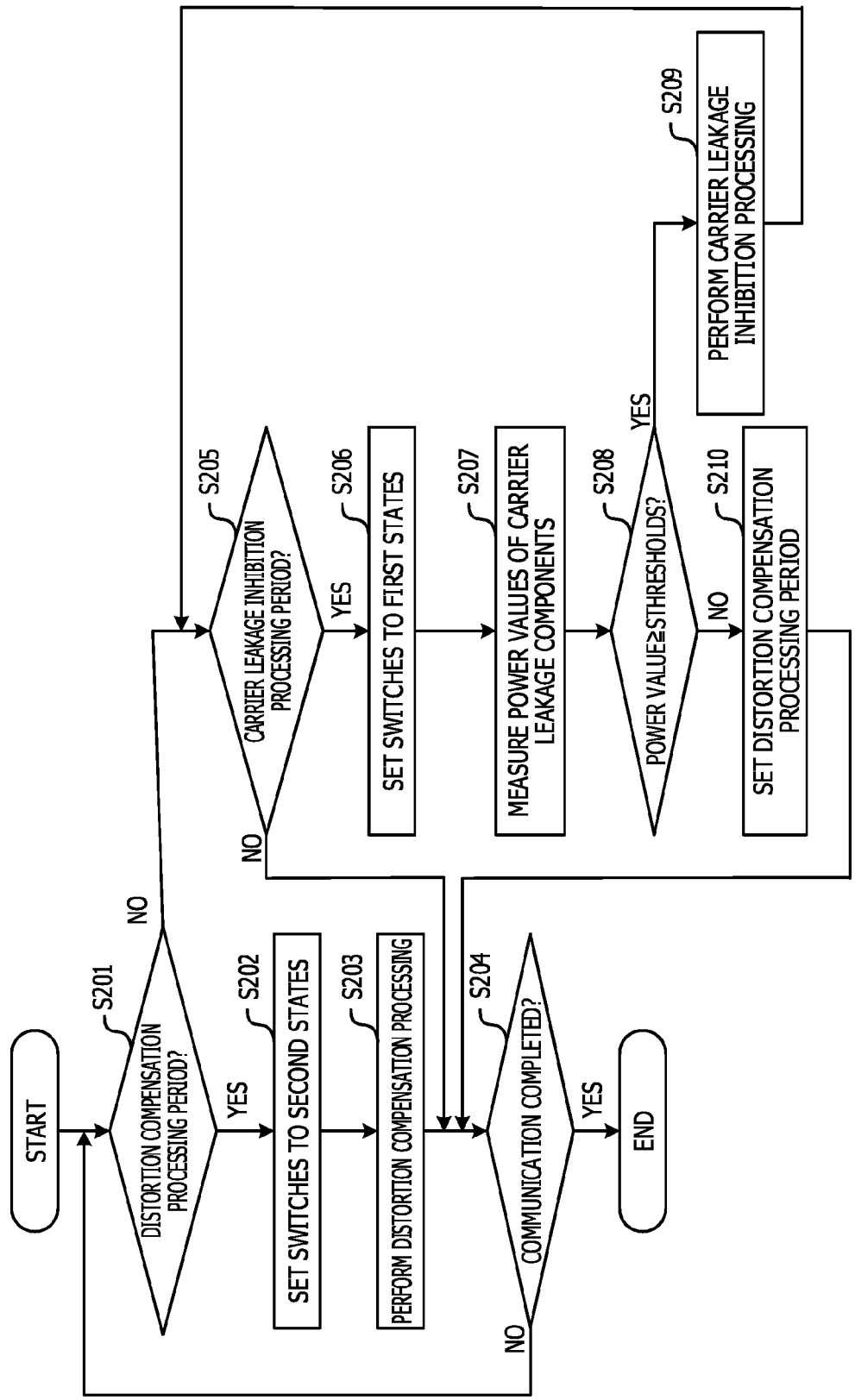
FIG. 7 is a flowchart illustrating an example of process operations of the wireless device of the second embodiment.

FIG. 7 is a flowchart illustrating an example of process operations of the wireless device of the second embodiment. The flow of FIG. 7 starts, for example, as communication begins.

The above-mentioned controller (not illustrated) of the wireless device 50 determines whether or not the current time is in the distortion compensation processing period (S201).

When it is determined that current time is in the distortion compensation processing period (Yes in S201), the controller sets the switches 51, 52 and 53 to their respective second states (S202). Thus, a signal, which is obtained by processing an output signal of the amplifier 17 with the frequency converter 18 and the ADC 19, is input to the distortion compensation unit 54.

The distortion compensation unit 54 performs distortion compensation processing based on an output signal of the ADC 19 (S203).

The controller determines whether or not communication has been completed (S204).

When communication has not been completed (No in S204), the flow returns to S201. On the other hand, when communication has been completed (Yes in S204), the flow ends.

When it is determined that the current time is not in the distortion compensation processing period (No in S201), the controller determines whether or not the current time is in the carrier leakage inhibition processing period (S205).

When it is determined that the current time is in the carrier leakage suppression period (Yes in S205), the controller sets the switches 51, 52, and 53 to their respective first states (S206). Thus, a signal, which is obtained by processing an output signal of the quadrature modulator 14 with the frequency converter 18 and the ADC 19, is input to the carrier leakage suppression unit 12. Note that when it is determined that the current time is not in the carrier leakage suppression period (No in S205), the flow proceeds to S204.

The carrier leakage suppression unit 12 measures the power values of carrier leakage components (S207).

The carrier leakage suppression unit 12 determines whether or not the measured power values are equal to or greater than thresholds (S208).

When the measured power values are equal to or greater than the thresholds (Yes in S208), the carrier leakage suppression unit 12 performs the carrier leakage inhibition processing (S209). The carrier leakage inhibition processing is repeated until the power values measured in the carrier leakage suppression period become less than the thresholds.

When the measured power values are less than the thresholds (No in S208), the controller changes the period setting to the distortion compensation processing period (S210). Then, the flow proceeds to S204.

According to this embodiment as described above, in the wireless device 50, the frequency converter 18 performs frequency shifting using the second local signal on a modulated signal output from the quadrature modulator 14 during the carrier leakage inhibition processing period. In contrast, during the distortion compensation processing period, the frequency converter 18 performs frequency shifting using the first local signal on an amplified signal output from the amplifier 17. Then, the carrier leakage suppression unit 12 performs the carrier leakage inhibition processing based on a signal obtained by the frequency converter 18 during the carrier leakage inhibition processing period. The distortion compensation unit 54 performs the distortion compensation processing based on a signal obtained by the frequency converter 18 during the distortion compensation processing period.

With this configuration of the wireless device 50, the frequency converter 18 may be used for both the carrier leakage inhibition processing and the distortion compensation processing. This may inhibit the circuit size of the wireless device 50 from being increased.

Third Embodiment

A third embodiment is related to a wireless device that performs transmission diversity.

Figure 8:
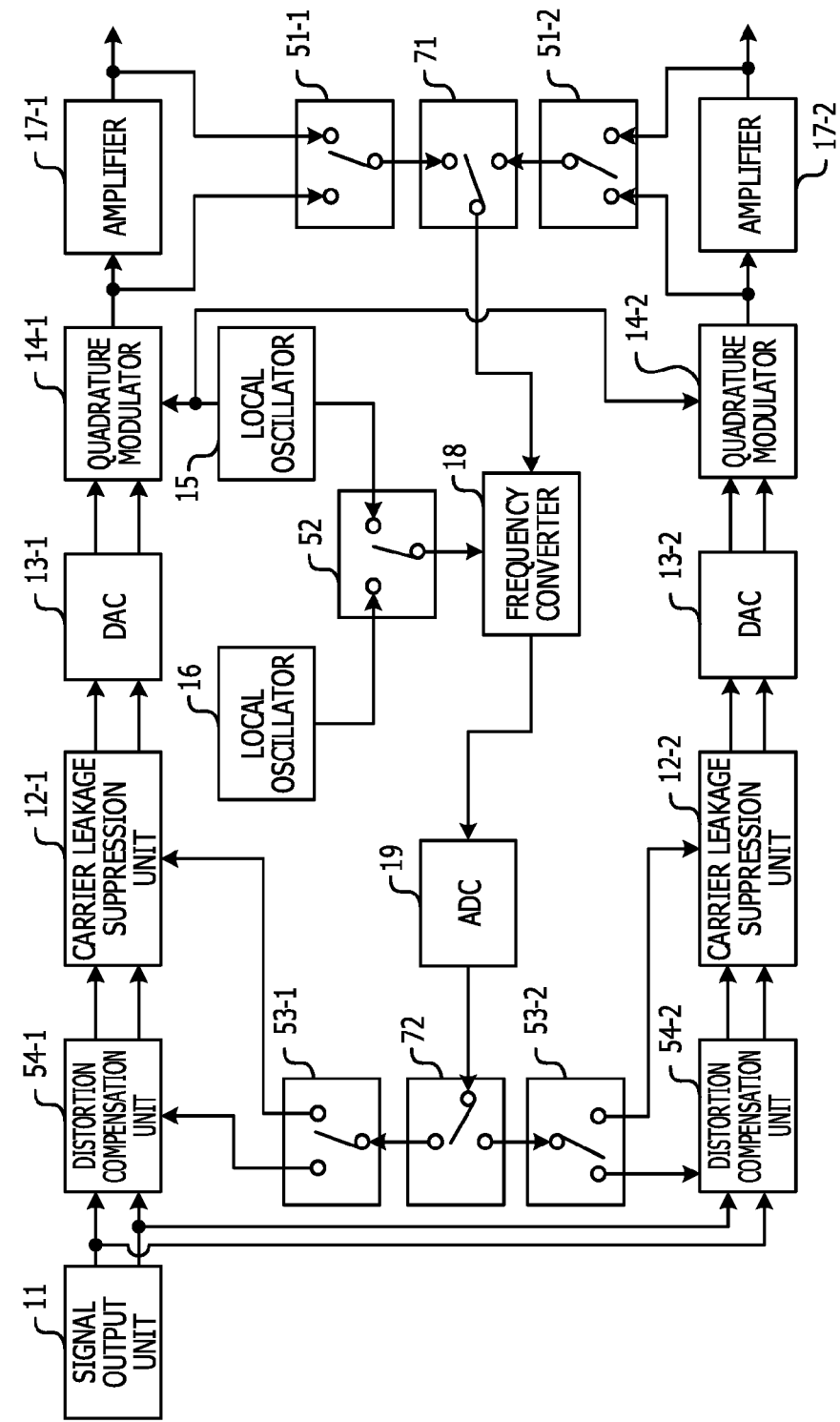
FIG. 8 is a block diagram illustrating an example of a wireless device of a third embodiment.

FIG. 8 is a block diagram illustrating an example of a wireless device of the third embodiment. A wireless device 70 illustrated in FIG. 8 includes a first transmission system and a second transmission system. That is, the wireless device 70 includes two transmission systems, each transmission system including the distortion compensation unit 54, the switches 51 and 53, the carrier leakage suppression unit 12, the DAC 13, the quadrature modulator 14, and the amplifier 17. In FIG. 8, functional units given a sub-number "1" correspond to a first transmission system, and functional units given a sub-number "2" correspond to a second transmission system.

The wireless device 79 also includes switches 71 and 72.

The switch 71 includes two input terminals and one output terminal. A first input terminal of the switch 71 is coupled to an output terminal of the switch 51-1. A second input terminal of the switch 71 is coupled to an output terminal of the switch 51-2. An output terminal of the switch 71 is coupled to the input of the frequency converter 18. The first input terminal and the output terminal of the switch 71 are coupled together during the "carrier leakage inhibition processing period" or the "distortion compensation processing period" of the first transmission system, and the second input terminal and the output terminal of the switch 71 are coupled together during the "carrier leakage inhibition processing period" or the "distortion compensation processing period" of the second transmission system. Thus, during a processing period for the first transmission system, a modulated signal or an amplified signal of the first transmission system is input to the frequency converter 18. Note that the state of the switch 71 is changed by control of a controller (not illustrated). Note also that a state where the first input terminal and the output terminal of the switch 71 are coupled together is called a "first state" of the switch 71, and a state where the second input terminal and the output terminal of the switch 71 are coupled together is called a "second state" of the switch 71.

A switch 72 includes one input terminal and two output terminals. The input terminal of the switch 72 is coupled to the output terminal of the ADC 19. The first output terminal of the switch 72 is coupled to an input terminal of the switch 53-1. The second output terminal of the switch 72 is coupled to an input terminal of the switch 53-2. The input terminal and the first output terminal of the switch 72 are coupled together during the "carrier leakage inhibition processing period" or the "distortion compensation processing period" of the first transmission system, and the input terminal and the second output terminal of the switch 72 are coupled together during the "carrier leakage inhibition processing period" or the "distortion compensation processing period" of the second transmission system. Thus, during a processing period for the first transmission system, a signal, which is obtained by processing a modulated signal or an amplified signal of the first transmission system with the frequency converter 18 and the ADC 19, is input to the switch 53-1. In contrast, during a processing period for the second transmission system, a signal, which is obtained by processing a modulated signal or an amplified signal of the second transmission system with the frequency converter 18 and the ADC 19, is input to the switch 53-2. Note that the state of the switch 72 is changed by control of a controller (not illustrated). Note also that a state where the input terminal and the first output terminal of the switch 72 are coupled together is called a "first state" of the switch 72, and a state where the input terminal and the second output terminal of the switch 72 are called together is called a "second state" of the switch 72.

The controller (not illustrated) sets the switches 71 and 72 to their respective first states during the "carrier leakage inhibition processing period" or the "distortion compensation processing period" of the first transmission system, and sets the switches 71 and 72 to their respective second states during the "carrier leakage inhibition processing period" or the "distortion compensation processing period" of the second transmission system.

According to this embodiment as described above, the frequency converter 18 and the ADC 19 are sharable between the first transmission system and the second transmission system of the wireless device 70. This may inhibit the circuit size of the wireless device 70 from being increased.

Fourth Embodiment

In a fourth embodiment, the carrier leakage inhibition processing is performed based on an amplified signal, which is an output of an amplifier.

Figure 9:
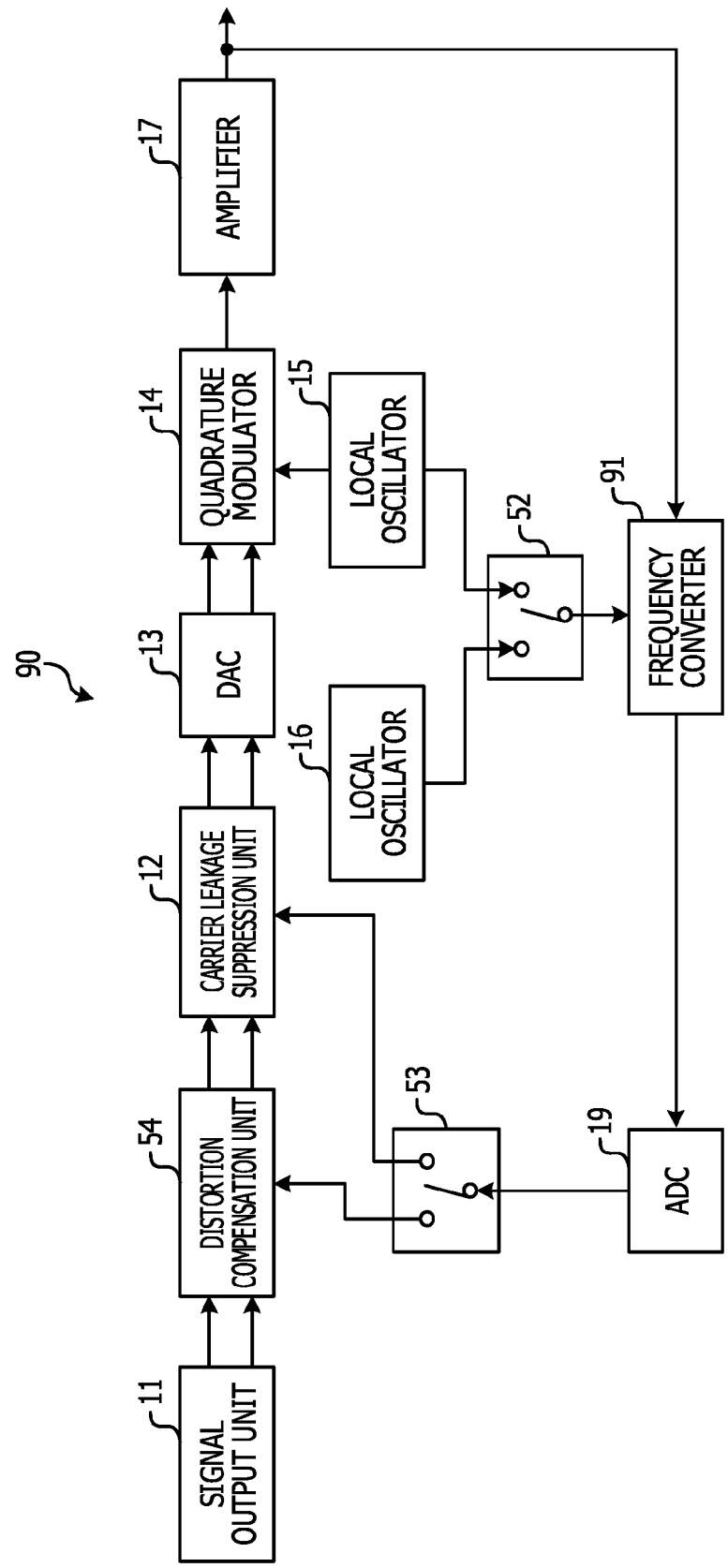
FIG. 9 is a block diagram illustrating an example of a wireless device of a fourth embodiment.

FIG. 9 is a block diagram illustrating an example of a wireless device of the fourth embodiment. In FIG. 9, a wireless device 90 includes a frequency converter 91.

While an amplified signal, which is an output of the amplifier 17, is input to the frequency converter 91, a modulated signal, which is an output of the quadrature modulator 14, is not input to the frequency converter 91. That is, amplified signals, which are outputs of the amplifier 17, are input to the frequency converter 91 during both the "carrier leakage inhibition processing period" and the "distortion compensation processing period". With this configuration, the switch 51 of the second embodiment is unnecessary.

According to this embodiment as described above, the path for input to the frequency converter may also be used for both the carrier leakage inhibition processing and the distortion compensation processing. This may inhibit the circuit size of the wireless device 90 from being increased. Note that, compared with the first to third embodiments, the fourth embodiment is advantageous in terms of the circuit size, although, in the fourth embodiment, since an amplified signal is dealt with in the carrier leakage inhibition processing, the accuracy in the carrier leakage suppression is likely to be reduced because of a distortion component contained in the amplified signal.

Other Embodiments

[1] The elements of the components illustrated in the drawings in the first embodiment to the fourth embodiment do not have to be configured physically as illustrated. That is, specific forms of distribution and integration of the components are not limited to those illustrated in the drawings. All or some of the components may be configured so as to be functionally or physically distributed and integrated in arbitrary units in accordance with various loads and usage situations.

Furthermore, all or any part of the various processing functions performed in each device may be executed on a central processing unit (CPU) (or on a micro-computer such as a micro processing unit (MPU) or a micro controller unit (MCU)). All or any part of the various processing functions may also be executed on a program analyzed and executed by a CPU (or a micro-computer such as an MPU or an MCU) or on hardware using wired logic.

The wireless devices of the first embodiment to the fourth embodiment may be implemented with the following hardware configuration.

Figure 10:
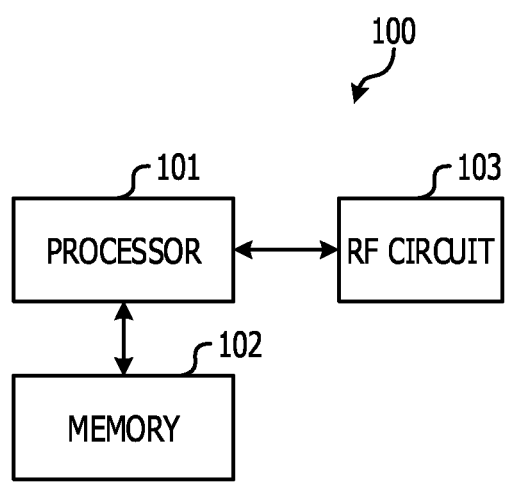
FIG. 10 is a diagram illustrating an example of a hardware configuration of the wireless device.

FIG. 10 is a diagram illustrating an example of a hardware configuration of the wireless device. As illustrated in FIG. 10, a wireless device 100 includes a processor 101, a memory 102, and a radio frequency (RF) circuit 103.

Examples of the processor 101 include a CPU, a digital signal processor (DSP), and a field programmable gate array (FPGA). Examples of the memory 102 include a random access memory (RAM) such as a synchronous dynamic random access memory (SDRAM), a read only memory (ROM), and a flash memory.

Various processing functions performed in the wireless devices of the first embodiment to the fourth embodiment may be implemented in such a way that programs stored in various kinds of memories, such as a nonvolatile storage medium, are executed by a processor included in an amplification device.

That is, programs that support processing performed by the signal output unit 11, the carrier leakage suppression unit 12, the switches 53 and 72, and the distortion compensation unit 54 may be recorded on the memory 102, and each program may be executed by the processor 101. In addition, the DAC 13, the quadrature modulator 14, the local oscillators 15 and 16, the amplifier 17, the frequency converters 18 and 91, the ADC 19, and the switches 51, 52, and 71 are implemented by the RF circuit 103.

[2] In addition, the processor 101 and the memory 102 may be provided in a control device separate from the wireless device 100. That is, a wireless access system that includes a control device including the processor 101 and the memory 102 and a wireless device including the RF circuit 103 may be configured.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless device comprising:
   a digital-to-analog converter that converts a digital transmission signal within a digital signal processing band to an analog transmission signal;
   a modulator that performs quadrature modulation of an analog transmission signal obtained by the digital-to-analog converter using a first local signal having a first frequency outside a frequency range, the frequency range centered around a center frequency of a transmission radio-frequency signal to be transmitted from the wireless device and having a bandwidth of the digital signal processing band, and outputs a modulated signal;
   a frequency converter that performs a frequency shift of a modulated signal output from the modulator using a second local signal having a second frequency within the frequency range; and
   an inhibitor that performs carrier leakage inhibition processing on the digital transmission signal, based on a signal obtained by the frequency converter;
   an amplifier that amplifies the modulated signal output from the modulator, and outputs an amplified signal; and
   a distortion compensator that performs, on the digital transmission signal, distortion compensation processing for compensating for a distortion included in the amplified signal,
   wherein the frequency converter performs a frequency shift using the second local signal on a modulated signal output from the modulator in a carrier leakage inhibition processing period, and performs a frequency shift using the first local signal on an amplified signal output from the amplifier in a distortion compensation processing period, and wherein the distortion compensator performs the distortion compensation processing based on a signal obtained by the frequency converter in the distortion compensation processing period.

2. A wireless access system comprising a wireless control device and a wireless device that wirelessly transmits a signal received from the wireless transmission control device, the wireless device including:
   a digital-to-analog converter that converts a digital transmission signal within a digital signal processing band to an analog transmission signal;
   a modulator that performs quadrature modulation of an analog transmission signal obtained by the digital-to-analog converter using a first local signal having a first frequency outside a frequency range, the frequency range centered around a center frequency of a transmission radio-frequency signal to be transmitted from the wireless device and having a bandwidth of the digital signal processing band, and outputs a modulated signal; and
   a frequency converter that performs a frequency shift of a modulated signal output from the modulator using a second local signal having a second frequency within the frequency range,
   at least one of the wireless device and the wireless control device includes an inhibitor that performs carrier leakage inhibition processing on the digital transmission signal, based on a signal obtained by the frequency converter,
   wherein the wireless device includes:
   an amplifier that amplifies the modulated signal output from the modulator, and outputs an amplified signal; and
   a distortion compensator that performs, on the digital transmission signal, distortion compensation processing for compensating for a distortion included in the amplified signal,
   wherein the frequency converter performs a frequency shift using the second local signal on a modulated signal output from the modulator in a carrier leakage inhibition processing period, and performs a frequency shift using the first local signal on an amplified signal output from the amplifier in a distortion compensation processing period, and wherein the distortion compensator performs the distortion compensation processing based on a signal obtained by the frequency converter in the distortion compensation processing period.

3. A wireless device comprising:
   a digital-to-analog converter that converts a digital transmission signal within a digital signal processing band to an analog transmission signal;
   a modulator that performs quadrature modulation of an analog transmission signal obtained by the digital-to-analog converter using a first local signal having a first frequency outside a frequency range, the frequency range centered around a center frequency of a transmission signal and having a bandwidth of the digital signal processing band, and outputs a modulated signal;
   an amplifier that amplifies a modulated signal output from the modulator and outputs an amplified signal;

a frequency converter that performs a frequency shift of an amplified signal output from the amplifier using the first local signal in a distortion compensation processing period, and performs a frequency shift of the amplified signal output from the amplifier using a second local signal having a second frequency within the frequency range in a carrier leakage inhibition processing period;

a distortion compensator that performs, on the digital transmission signal, distortion compensation processing for compensating for a distortion included in the amplified signal, based on a signal obtained by the frequency converter in the distortion compensation processing period; and an inhibitor that performs carrier leakage inhibition processing on the digital transmission signal based on a signal obtained by the frequency converter in the carrier leakage inhibition processing period.

4. The wireless device according to claim 1, further comprising:

an amplifier that amplifies the modulated signal output from the modulator, and outputs an amplified signal; and a second switch, coupled to the amplifier and the frequency converter, that outputs the modulated signal and the amplified signal selectively to the frequency converter.

5. The wireless device according to claim 1, further comprising:

an analog-to-digital converter that converts an output of the frequency converter to a digital signal; and a third switch, coupled to the analog-to-digital converter, that outputs the digital signal to the inhibitor selectively.

6. The wireless device according to claim 5, further comprising:

a distortion compensator that performs, on the digital transmission signal, distortion compensation processing based on the digital signal, wherein the third switch outputs the digital signal to the inhibitor and the distortion compensator selectively.

7. The wireless access system according to claim 2, wherein the wireless device includes:

an amplifier that amplifies the modulated signal output from the modulator, and outputs an amplified signal; and a second switch, coupled to the amplifier and the frequency converter, that outputs the modulated signal and the amplified signal selectively to the frequency converter.

8. The wireless access system according to claim 2, wherein the wireless device includes:

an analog-to-digital converter that converts an output of the frequency converter to a digital signal; and a third switch, coupled to the analog-to-digital converter, that outputs the digital signal to the inhibitor selectively.

9. The wireless access system according to claim 8, wherein the wireless device includes:

a distortion compensator that performs, on the digital transmission signal, distortion compensation processing based on the digital signal, wherein the third switch outputs the digital signal to the inhibitor and the distortion compensator selectively.

10. The wireless device according to claim 1, further comprising:

a first local oscillator that outputs the first local signal;

a second local oscillator that outputs the second local signal; and a first switch, coupled to the first local oscillator and the second local oscillator, that outputs the first local signal and the second local signal selectively to the frequency converter.

11. The wireless access system according to claim 2, wherein the wireless device:

a first local oscillator that outputs the first local signal;

a second local oscillator that outputs the second local signal; and a first switch, coupled to the first local oscillator and the second local oscillator, that outputs the first local signal and the second local signal selectively to the frequency converter.

* * * * *